(12) United States Patent
Hou

(10) Patent No.: US 9,930,402 B2
(45) Date of Patent: Mar. 27, 2018

(54) AUTOMATED AUDIO ADJUSTMENT

(71) Applicant: Verizon Patent and Licensing Inc., Basking Ridge, NJ (US)

(72) Inventor: Junhua Hou, Shanghai (CN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/785,745

(22) PCT Filed: Jun. 27, 2013

(86) PCT No.: PCT/CN2013/078156
§ 371 (c)(1),
(2) Date: Oct. 20, 2015

(87) PCT Pub. No.: WO2014/205734
PCT Pub. Date: Dec. 31, 2014

(65) Prior Publication Data
US 2016/0073153 A1 Mar. 10, 2016

(51) Int. Cl.
*H04N 21/4223* (2011.01)
*H04N 21/439* (2011.01)
*H04N 21/442* (2011.01)
*H04N 21/45* (2011.01)
*H04N 21/422* (2011.01)

(52) U.S. Cl.
CPC ....... *H04N 21/439* (2013.01); *H04N 21/4223* (2013.01); *H04N 21/42203* (2013.01); *H04N 21/44204* (2013.01); *H04N 21/44218* (2013.01); *H04N 21/4532* (2013.01)

(58) Field of Classification Search
CPC combination set(s) only.
See application file for complete search history.

(56) References Cited

U.S. PATENT DOCUMENTS

| | | | |
|---|---|---|---|
| 6,760,635 B1 | 7/2004 | Bates et al. | |
| 9,288,387 B1 * | 3/2016 | Keller | H04N 21/44218 |
| 9,311,043 B2 * | 4/2016 | Rottler | G06F 3/0482 |
| 2010/0057445 A1 * | 3/2010 | Aoki | H04M 3/564 |
| | | | 704/201 |

FOREIGN PATENT DOCUMENTS

| | | |
|---|---|---|
| CN | 1893471 A | 1/2007 |
| CN | 201845543 U | 5/2011 |

\* cited by examiner

*Primary Examiner* — Kieu Oanh T Bui

(57) ABSTRACT

In embodiments, apparatuses, methods and storage media are described that are associated with adjusting audio during content presentation. While content is being presented, one or more persons may be identified that are consuming the content. The persons may be identified via various techniques, such as voice recognition, facial recognition, and distance detection. When persons may be uniquely identified, user audio preferences may be retrieved and used to adjust audio. Audio may be adjusted when persons are not uniquely identified, such as based on a number of persons or their location relative to a content consumption device. Audio adjustment may include volume adjustment and/or adjustment of audio, such as through application of audio effects, as it being presented. Other embodiments may be described and claimed.

19 Claims, 7 Drawing Sheets

AUTOMATED AUDIO ADJUSTMENT

TECHNICAL FIELD

The present disclosure relates to the field of data processing, in particular, to apparatuses, methods and systems associated with control of audio during content presentation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. In various scenarios, content may be consumed under varying circumstances, by varying audiences, and by audiences at varying distances and/or placements from a content consumption device. Content may be viewed and/or listened to by multiple persons at once, and in a variety of auditory circumstances. For example, the persons consuming content may change during presentation, and non-content noise (such as from human activity or simple background noise) may be present during content presentation. It may therefore be difficult to provide a consistent content consumption experience for audiences.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
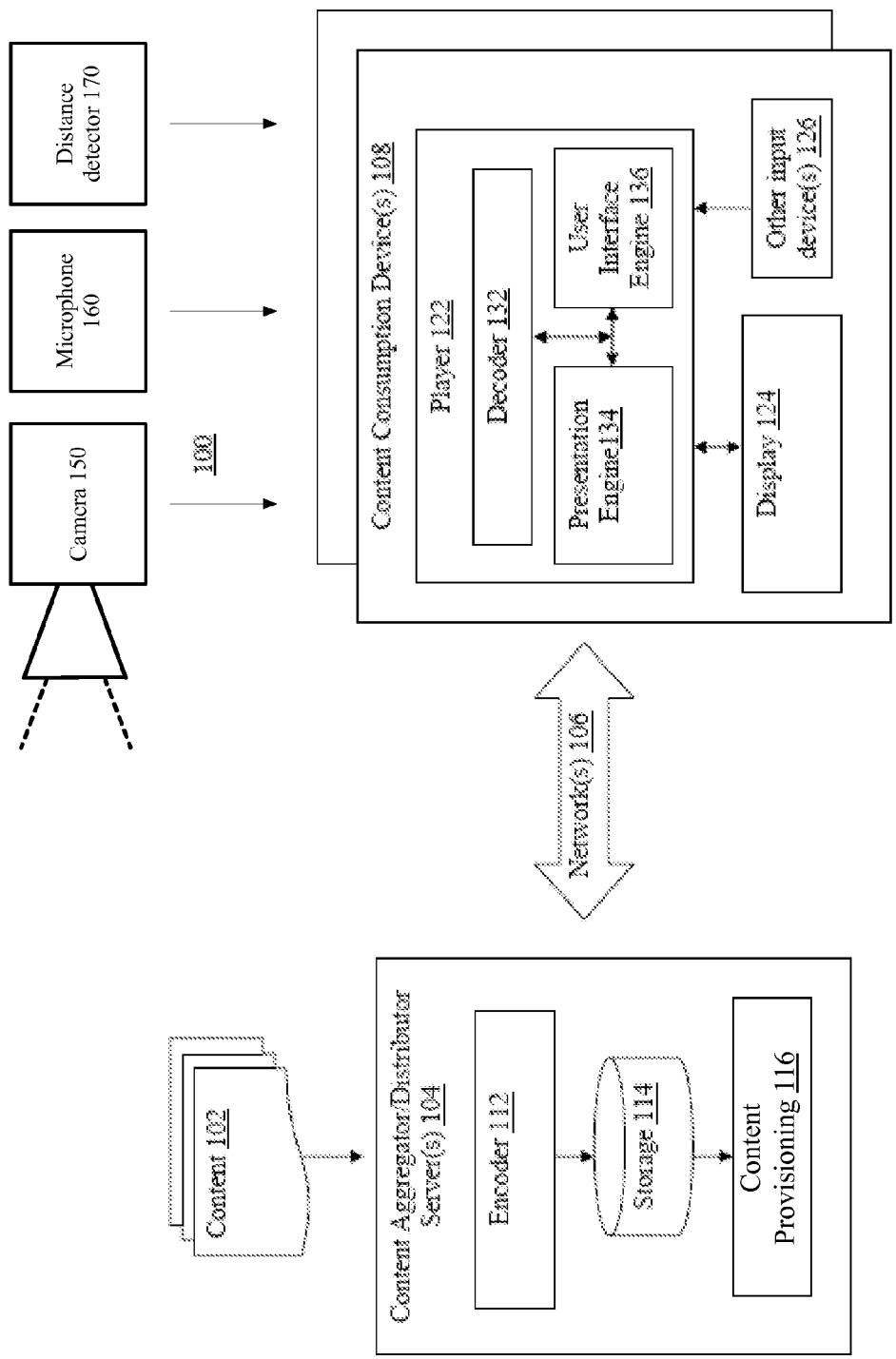
FIG. 1 illustrates an example arrangement for content distribution and consumption, in accordance with various embodiments.

Embodiments described herein are directed to, for example, methods, computer-readable media, and apparatuses associated with adjusting audio during content presentation. In various embodiments, while content is being presented, one or more persons may be identified that are consuming the content. In various embodiments, the persons may be identified via various techniques, such as voice recognition, facial recognition, and distance detection. In various embodiments, when persons may be uniquely identified, user audio preferences may be retrieved and used to adjust audio. In various embodiments, audio may be adjusted when persons are not uniquely identified, such as based on a number of persons or their location relative to a content consumption device. In various embodiments, audio adjustment may include volume adjustment and/or adjustment of audio, such as through application of audio effects, as it being presented.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content creators and/or providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, the content aggregator/distributor server(s) 104 may further include a video frame alignment system 118 ("VFA 118"), which may be coupled to various components of the content aggregator/distributor server(s) 104, including, for example, encoder 112 and/or content provisioning 116. In various embodiments, the VFA 118 may be configured to receive pieces of video content and to output an alignment of video frames so as to provide for comparisons of video content during encoding and/or provisioning. The usage and potential benefit from having the alignment information will be further described below. Particular embodiments of the VFA 118 may be described below.

Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, the content creators/providers may also provide physical media. In various embodiments, the physical media may include various forms of media that encode content in digital and/or analog forms, including, but not limited to DVDs, Blu-Rays™, CDs, analog audio recordings, books, etc. In various embodiments, the content creator/providers may provide content in both a digitally-transmissible form that may be downloaded over a network (e.g., the content 102 that may be encoded by encoder 112 and provisioned by content provisioning 116) as well as in physical media form. In various embodiments, and for the sake of clarity herein, content that is provided via the content provisioning 116 via network(s) 106 may be referred to as "downloadable content," while content that is encoded in physical form may be referred to as being encoded on "physical media." In various embodiments, the physical media may be associated with particular content 102 and thus with one or more pieces of downloadable content that may be downloaded for consumption by a content consumer.

In various embodiments, as shown, a content consumption device 108 may include player 122, display 124 and input device(s) 126. Player 122 may be configured to receive streamed content, decode and recover the content from the content stream, and present the recovered content on display 124, in response to user selections/inputs from input device(s) 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from input device 126 that are indicative of the user selections/inputs from a user, and to selectively render a contextual information interface as described herein.

While shown as part of a content consumption device 108, display 124 and/or input device(s) 126 may be stand-alone devices or integrated, for different embodiments of content consumption devices 108. For example, for a television arrangement, display 124 may be a stand alone television set, Liquid Crystal Display (LCD), plasma and the like, while player 122 may be part of a separate set-top set, and input device 126 may be a separate remote control (such as described below), gaming controller, keyboard, or another similar device. Similarly, for a desktop computer arrangement, player 122, display 124 and input device(s) 126 may all be separate stand alone units. On the other hand, for a tablet arrangement, display 124 may be a touch sensitive display screen that includes input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and input device(s) 126 may be likewise integrated.

In various embodiments, the presentation engine 134 may be configured to automatically adjust audio during presentation of content. The presentation engine 134 may be configured with one or more modules, such as described below with reference to FIG. 2, that may identify one or more persons and adjust audio accordingly. In various embodiments, while the term "identify" is used herein, it may be understood to include a variety of types of identification and/or recognition of persons. Thus, in various embodiments, the presentation engine 134 may be configured to recognize the presence (and/or location) of one or more persons without uniquely identifying the persons themselves. In other embodiments, the presentation engine 134 may be configured to uniquely identify one or more persons. Thus, the term "identify" should not be read to specifically require that the presentation engine 134 must uniquely identify any one person consuming content.

In various embodiments, the content consumption device 108 may also include or be coupled to one or more automatic input devices that are configured to detect audio, video, and/or presence of persons consuming content presented by the content consumption device 108. For example, in various embodiments the content consumption device(s) 108 may be coupled with a camera 150. In various embodiments, this camera may include various devices, including separate or attached cameras, webcams, video and/or still cameras, etc. In various embodiments, the camera 150 may be configured to capture still images and/or video of persons consuming content from the content consumption device 108. In various embodiments, these still images and/or video may be utilized by the presentation engine 134 to adjust audio for presented content.

In various embodiments, the content consumption device 108 may include or be coupled to a microphone 160. In various embodiments, the microphone 160 may include separate or attached microphones, or may include microphones of other devices, such as separate computing devices, or mobile devices such as smartphones. In various embodiments, the microphone 160 may be configured to capture audio of one or more persons consuming content from the content consumption device 108. In various embodiments, the microphone 160 may also be configured to capture background audio, such as background noise. In various embodiments, this captured audio may be utilized by the presentation engine 134 to adjust audio for presented content.

In various embodiments, the content consumption device 108 may include or be coupled to a distance detector 170. In various embodiments, the distance detector 170 may be configured to detect the presence and/or motion of one or more persons consuming content being presented by the content consumption device 108. In various embodiments, this presence and/or motion may be utilized by the presentation engine 134 to adjust audio for presented content.

Figure 2:
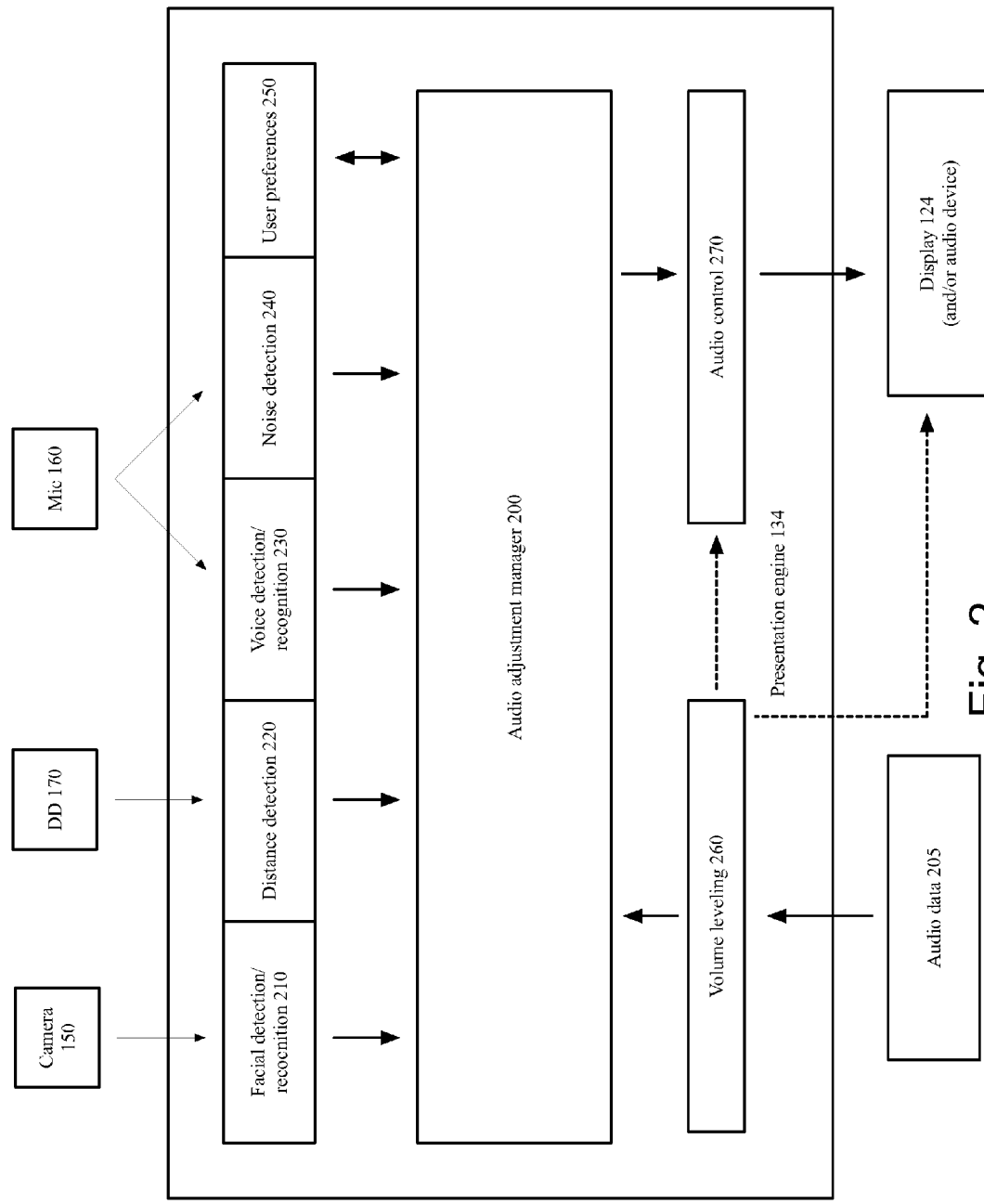
FIG. 2 illustrates an example arrangement of modules for adjusting content audio, in accordance with various embodiments.

Referring now to FIG. 2, an example arrangement for automatic audio adjustment is shown in accordance with various embodiments. As discussed above, in various embodiments, the presentation engine 134 may be configured to identify one or more persons consuming content from the content consumption device and to adjust audio based on this identification. In various embodiments, the presentation engine 134 may include one or more modules (which may be implemented in hardware and/or software) to perform this identification and adjustment. While FIG. 2 illustrates various modules as being included in the presentation engine 134, in various embodiments, one or more of the modules illustrated in FIG. 2 may be located outside of the presentation engine 134

In various embodiments, the presentation engine may include an audio adjustment manager 200 ("AAM 200"), which may be configured to communicate with one or more modules to perform and/or facilitate the identification and adjustment techniques described herein. In various embodiments, the AAM 200 may be configured to communicate with one or more identification modules.

For example, in various embodiments, the AAM 200 may be configured to communicate with a facial detection/recognition module 210 ("FM 210"). In various embodiments, the FM 210 may be configured to receive captured images and/or video from the camera 150. The FM 210 may be further configured to detect one or more persons whose images have been captured by the camera 150. In some embodiments, the FM 210 may be configured to detect the presence of one or more persons, such as by detecting a body shape and/or the presence of one or more face shapes. In such embodiments, the FM 210 may not uniquely identify individual persons, but may instead determine a number and/or placement for people consuming content based on the images and/or video captured by the camera 150. In other embodiments, the FM 210 may be configured to uniquely identify one or more persons so that specific persons may be identified as consuming content. In some such embodiments, the FM 210 may be configured to perform facial recognition on the images and/or video captured by the camera 150. In some embodiments, the FM 210 may consult one or more stores of user identification data (not pictured) which the FM 210 may utilize to uniquely identify faces. In various embodiments, the FM 210 may detect and/or recognize faces according to known techniques.

In various embodiments, the AAM 200 may also be configured to communicate with a distance detection module 220 ("DM 220"). The DM 220 may be configured, in various embodiments to communicate with the distance detector 170 to determine the physical presence of one or more persons that are consuming content being presented, such as by being proximate to the content consumption device 108. In various embodiments, the DM 220 may be configured to determine a number of persons that are consuming presented content and/or the physical location of such persons in relation to presentation of the content. In various embodiments, the DM 220 may determine the presence of persons according to known techniques.

In various embodiments, the AAM 200 may also be configured to communicate with a voice detection/recognition module 230 ("VM 230"). In various embodiments, the VM 230 may be configured to receive captured audio from the microphone 160. The VM 230 may be further configured utilize the received audio to detect and/or recognize speech from audio of one or more persons. In some embodiments, the VM 230 may be configured to detect the presence of one or more persons. In such embodiments, the VM 230 may not uniquely identify individual persons, but may instead determine simply that the persons are present. In various embodiments, the VM 230 may detect the presence of audio in a human speech range to detect persons.

In other embodiments, the VM 230 may be configured to uniquely identify one or more persons so that specific persons may be identified as consuming content. In some such embodiments, the VM 230 may be configured to perform voice recognition on the audio captured by the microphone 160. In other embodiments, the VM 230 may be configured to recognize uniquely identifying commands from persons consuming content. For example, a person may speak an identification word or phrase in the presence of the microphone 160; the VM 230 may then be configured to identify the person based on the word or phrase. In some embodiments, the VM 230 may consult one or more stores of user identification data (not pictured) which the VM 230 may utilize to uniquely identify voices and/or speech. In various embodiments, the VM 230 may detect and/or recognize voices and/or speech according to known techniques. In various embodiments, the VM 230 may also be configured to detect if a person is attempting to use voice commands, such as to control actions of the content consumption device 108. In such embodiments, the AAM 200 may be configured to adjust audio to facilitate recognition of voice commands.

In various embodiments, the AAM 200 may also be configured to communicate with a noise detection module 240 ("NM 240"). The NM 240 may be configured, in various embodiments to communicate with the microphone 160 to determine a background level of noise in proximity to presentation of content by the content consumption device. In various embodiments, the NM 240 may detect noise by observing audio captured by the microphone 160 that is outside of a human vocal range. In various embodiments, the NM 240 may be configured to detect noise in the presence of audio from content that is being presented, such as by subtracting or otherwise accounting for audio from content being presented when detecting noise.

In various embodiments, the AAM 200 may also be configured to communicate with user preferences storage 250 ("US 250"). In various embodiments, the US 250 may be configured to store one or more audio preferences for particular users and/or groups of users. In various embodiments, these preferences may include one or more of volume preferences, equalizer preferences, balance and/or fader preferences, and/or other audio preferences. In various embodiments, when persons are uniquely identified, such as by the FM 210 and/or the VM 230, the AAM 200 may utilize the preferences stored in the US 250 to determine particular preferences of the uniquely identified users. These preferences may then be taken into account by the AAM 200 when adjusting audio for content being presented.

In various embodiments, the AAM 200 may be configured to communicate with one or more modules for audio adjustment, as well. For example, in various embodiments, the presentation engine 134 (or other entity) may include a volume leveling module 260 ("VL 260"). The volume leveling module 260 may receive audio data 205, such as from decoder 132, and may level, normalize, or otherwise adjust volume, such as to provide a more consistent volume during content presentation. For example, the VL 260 may adjust commercial volume, which may be encoded at a higher level than surrounding content, to be played at a similar level as the surrounding content. In other embodiments, the VL 260 may normalize volume across channels or between pieces of content. In various embodiments, the AAM 200 may be configured to receive adjusted audio from the VL 260 and to further adjust it according to identified persons consuming the content.

In some embodiments, the AAM 200 may be configured to communicate with an audio control module 270 ("AC 270"). In various embodiments, the AC 270 may be configured to adjust audio presented at a display 124, or other audio device, according to determinations made by the AAC 200. In some such embodiments, the VL 260 may provide audio directly to the display 124 or other audio device, and the AC 270 may then control the audio of the display 124 or other audio device. In alternative embodiments, the AC 270 may be configured to receive audio directly, such as from the VL 260, and to adjust the audio itself before providing it to the display 124 or other audio device.

Figure 3:
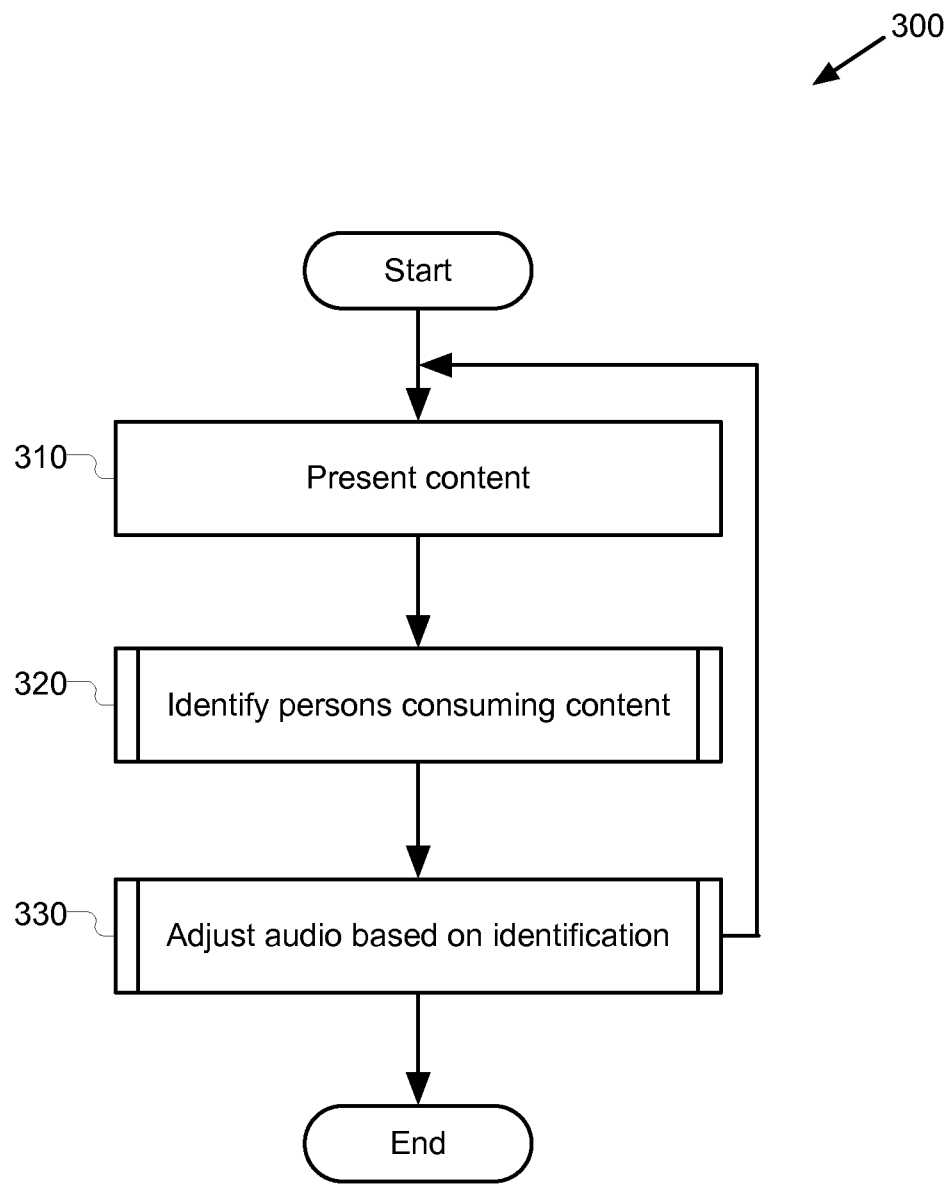
FIG. 3 illustrates an example process for adjusting content audio, in accordance with various embodiments.

Referring now to FIG. 3, an example process 300 for adjusting content audio is illustrated in accordance with various embodiments. While FIG. 3 illustrates particular example operations for process 300, in various embodiments, process 300 may include additional operations, omit illustrated operations, and/or combine illustrated operations. In various embodiments, process 300 may be performed by the presentation engine 134 of the content consumption device(s) 108. The process may begin at operation 310, where the presentation engine 134 may present content to one or more persons. In various embodiments, different types and formats of content, both audio and/or video, maybe presented by the presentation engine 134 at operation 310.

Next, at operation 320, the presentation engine 134, and specifically the AAM 200, may identify one or more persons consuming the content. As discussed herein, in various embodiments, at operation 320 the AAM 200 may uniquely identify one or more persons, or may simply identify a number and/or location of one or more persons consuming the content. Particular examples of operation 320 are described according to various embodiments below with respect to process 400 of FIG. 4. Next, at operation 330, the presentation engine 134, and specifically the AAM 200, may adjust audio for the content being presented. In various embodiments, the adjustment performed at operation 330 may be based at least in part on the one or more persons identified at operation 320. In various embodiments, the process may then repeat at operation 310 for additional presentation of content, identification of persons, and adjusting of audio. In other embodiments, the process may then end.

Figure 4:
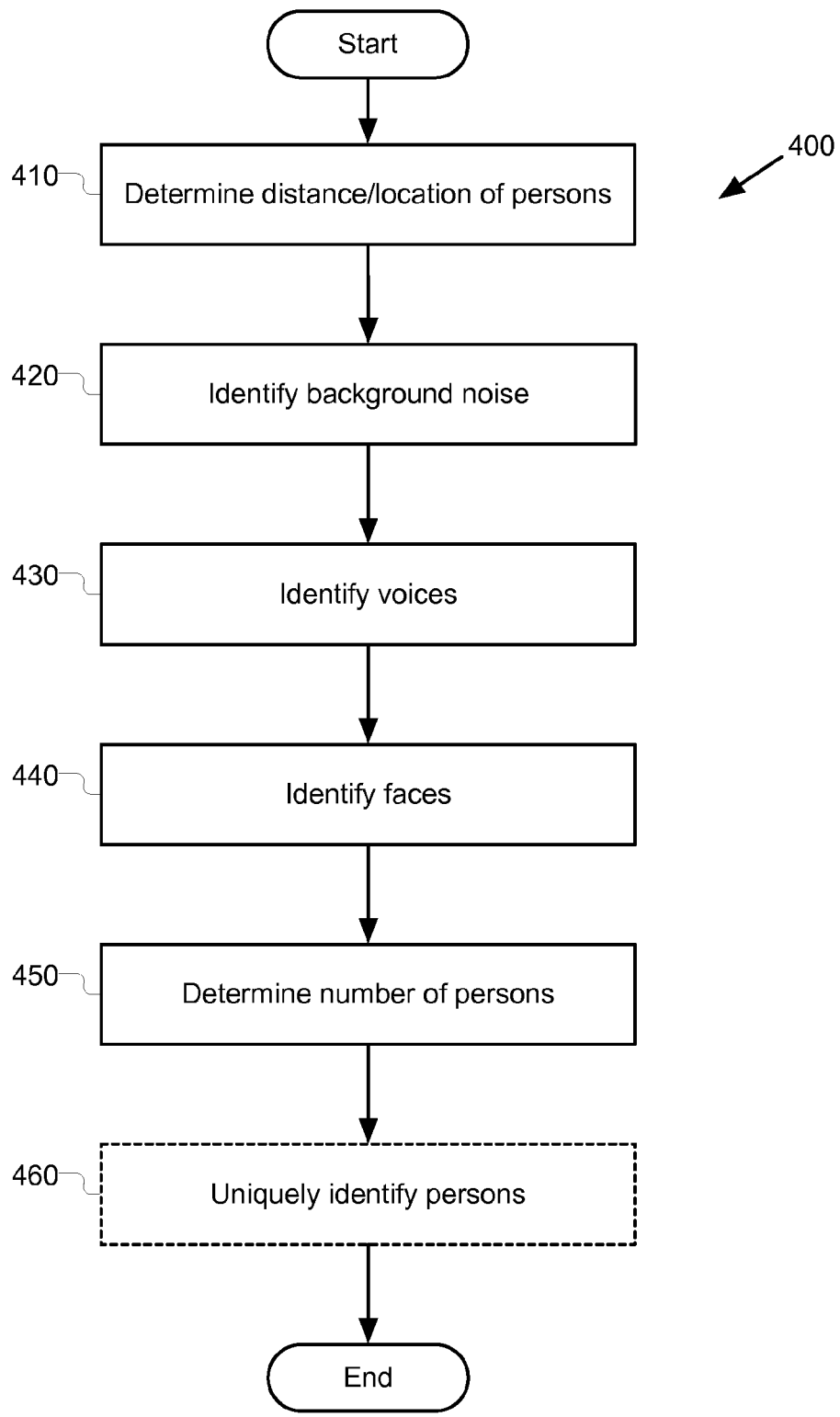
FIG. 4 illustrates an example process for identifying persons during content presentation, in accordance with various embodiments.

Referring now to FIG. 4, an example process 400 for identifying persons during content presentation is illustrated in accordance with various embodiments. While FIG. 4 illustrates particular example operations for process 400, in various embodiments, process 400 may include additional operations, omit illustrated operations, and/or combine illustrated operations. Various embodiments of process 400 may implement operation 320 of process 300 of FIG. 3. In various embodiments, process 400 may be performed by one or more modules of the presentation engine 134. The process may begin at operation 410, where the presentation engine 134, may determine the distance and/or location for persons consuming the content. In various embodiments, the DM 220, may determine the distance of one or more persons from the content consumption device 108 and/or the location of one or more persons proximate to the content consumption device 108. In various embodiments, the FM 210 and/or the VM 230 may also determine distance and or location of persons. For example, the FM 210 may determine, based on images captured by the camera 150, that persons are located in particular positions. In another example, the VM 230 may determine, based on audio captured by the microphone 160, how far away one or more persons are from the content consumption device 108. Next, at operation 420, the NM 240 may determine background noise around the content consumption device 108. As discussed above, in various embodiments, the NM 240 may determine a level of audio outside of a human vocal range that is present in audio captured by the microphone 160 to determine a level of background noise.

Next, at operation 430, the VM 230 may identify voices of one or more persons consuming the content, such as by based on audio captured by microphone 160. Next, at operation 440, the FM 230 may identify face of one or more persons consuming the content, such as based on images and/or video captured by camera 150. Next, at operation 450, the AAM 200 may determine a number of persons that are consuming the content. In various embodiments, this determination of number of persons may be based on one or more of the determined distance, location, faces, and/or voices from operations 410, 430, and 440. In various embodiments, the AAM 200 may determine a number of persons itself based on data from the DM 220, FM 210, and/or VM 230. In other embodiments, the AAM 200 may receive determinations from the DM 220, FM 210, and/or VM 230 of how many persons are detected by each module; the AAM 200 may then determine a number of persons from these individual determinations.

Next, at operation 460, the FM 210 and/or the VM 230 may uniquely identify one or more persons. In various embodiments, unique identifications may be based on faces that have been uniquely identified by the FM 210. In various embodiments, unique identifications may be based on voices that have been uniquely identified by the VM 230. In various embodiments, unique identifications may be based on voice indicators, such as passwords or passphrases spoken aloud by the VM 230. In some embodiments, operation 460 may not be performed at all or may be unable to be performed based on a lack of available information, and persons may not be uniquely identified. Instead, persons may be identified by number, location, and/or proximity without unique identification. The process may then end.

Figure 5:
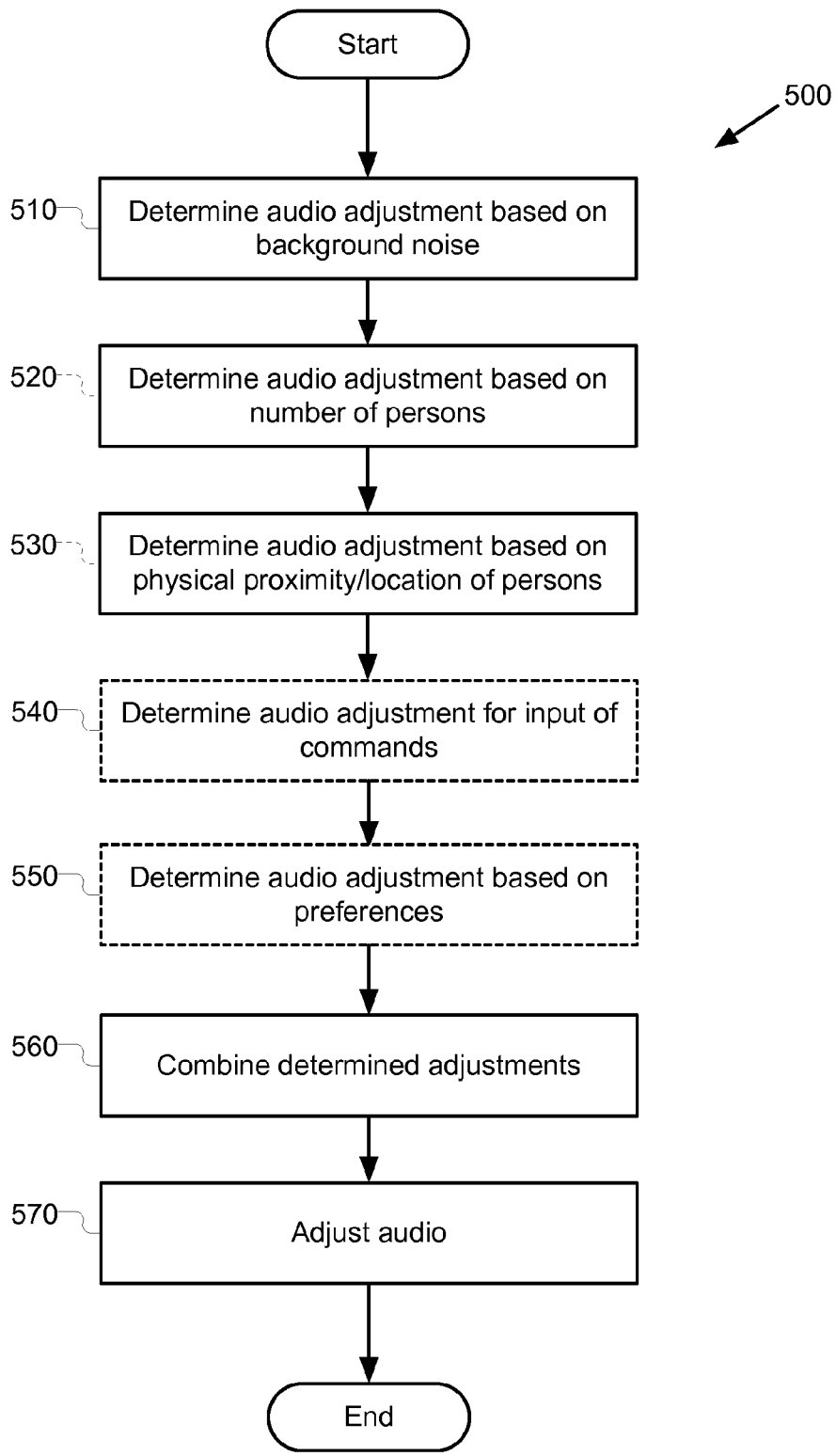
FIG. 5 illustrates an example process for adjusting audio based on identified persons, in accordance with various embodiments.

Referring now to FIG. 5, an example process 500 for adjusting audio based on identified persons is illustrated in accordance with various embodiments. While FIG. 5 illustrates particular example operations for process 500, in various embodiments, process 500 may include additional operations, omit illustrated operations, and/or combine illustrated operations. Various embodiments of process 500 may implement operation 330 of process 300 of FIG. 3. In various embodiments, process 500 may be performed by one or more modules of the presentation engine 134, and in particular by the AAM 200.

The process may begin at operation 510, where the AAM 200 may determine audio adjustments based on background noise. In various embodiments, the AAM may, based on background noise, such as, for example, air-conditioning noise, increase volume of audio content being presented to account for background noise. Next, at operation 520, the AAM 200 may determine audio adjustments based on a number of persons. For example, if audio is set at a certain volume when two people are in a room and then the number of people increases to 10 people, the AAM 200 may increase the volume to account for additional noise from the people. Next, at operation 530, the AAM 200 may determine audio adjustments based on the physical proximity of persons consuming content. Thus, for example, the AAM 200 may decrease volume if a person consuming content is very close to a display 124 or the content consumption device 108, or may increase volume if persons are far away. In another example, if a majority of persons are on a particular side of a room and/or display, the AAM 200 may adjust a balance of the audio to provide additional volume where a greater number of people are.

Next, at operation 540, the AAM 200 may optionally determine if a voice command has been given by a person, and if so may determine audio adjustments for the content to facilitate input of commands. In various embodiments, the AAM 200 may be configured to determine if the content consumption device 108 is currently in a mode to accept commands. In other embodiments, the AAM 200 may determine whether the VM 230 has identified a voice command captured by microphone 160 and/or another audio capture device. In various embodiments, the AAM 200 may lower the volume of the content being presented in order that voice commands may be better captured and/or that a person providing the voice commands does not have to speak as loudly.

Next, at operation 550, the AAM 200 may determine if any persons were uniquely identified and, if so, may determine audio adjustments based on preferences of the uniquely identified persons. In various embodiments, at operation 550 the AAM 200 may retrieve user preferences from the US 250 and use these preferences to adjust audio. For example, the AAM 200 may adjust volume closer to an identified preferred volume level for a uniquely identified person. In another example, the AAM 200 may utilize particular equalizer, fader, balance, or other preferences for a person based on preferences stored in the US 200.

In various embodiments, audio content may be classified based on a type for the content, such as, for example, movies, sports, music videos, video games, classical music, live music, etc., Thus, in various embodiments, at operation 250, for these different types, the AAM 200 may utilize different effects preferences of the identified person (such as volume, balance, fader, equalizer, etc) to adjust audio. In other embodiments, the AAM may select pre-determined sets of adjustments based on the type of content. For example, on detection of a sports program, the AAM 200 may select one or more predetermined audio settings specifically associated with sports programming. In another example, a "movie" set of adjustments may be automatically utilized by the AAM 200 in response to presentation of a movie. In various embodiments, the AAM 200 may combine these adjustments with adjustments based on preferences of on or more identified persons.

Next, at operation 560, the AAM 200 may combine the determined adjustments. In various embodiments, the AAM 200 may combine adjustments based on various criteria or persons. Thus, in some embodiments, if one adjustment may cause volume to increase while another may cause volume to decrease, the AAM 200 may combine these adjustments to set volume at a different level entirely, and/or to ignore one or more determined adjustments. Similarly, if multiple persons are identified as consuming content together, adjustments for the different persons, adjustments for the persons may be combined and/or ignored in various embodiments.

Next, at operation 570, the AAM 200 may adjust the audio according to the determined combined adjustment. In various embodiments, the AAM 200 may adjust the audio by sending commands or data to the AC 270 in order to facilitate adjustment of audio. The process may then end.

Figure 6:
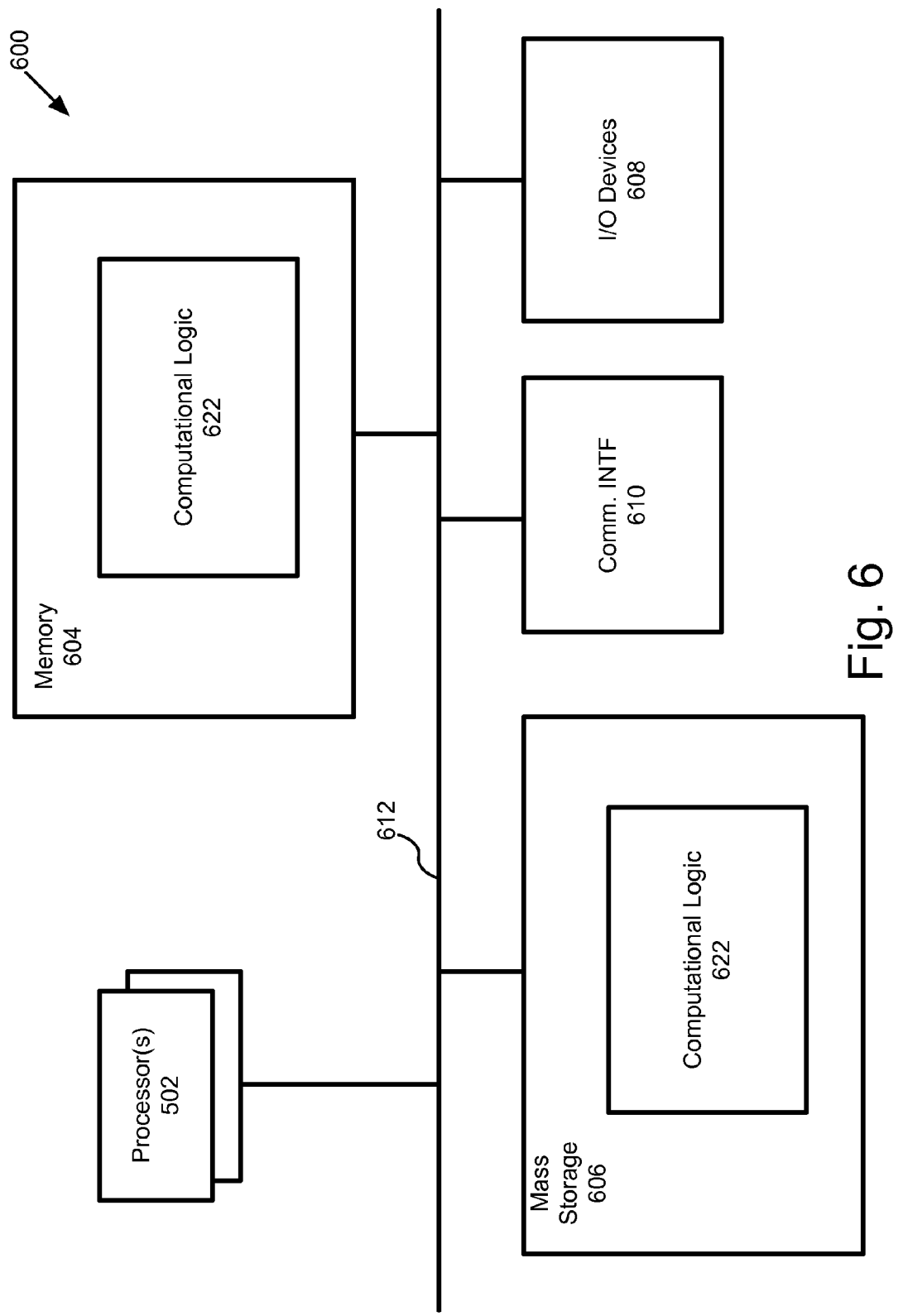
FIG. 6 illustrates an example computing environment suitable for practicing various aspects of the present disclosure, in accordance with various embodiments.

Referring now to FIG. 6, an example computer suitable for practicing various aspects of the present disclosure, including processes of FIGS. 3-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content consumption device 108 as shown in FIGS. 3-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108 (e.g., a player 122). Their constitutions are otherwise known, and accordingly will not be further described.

Figure 7:
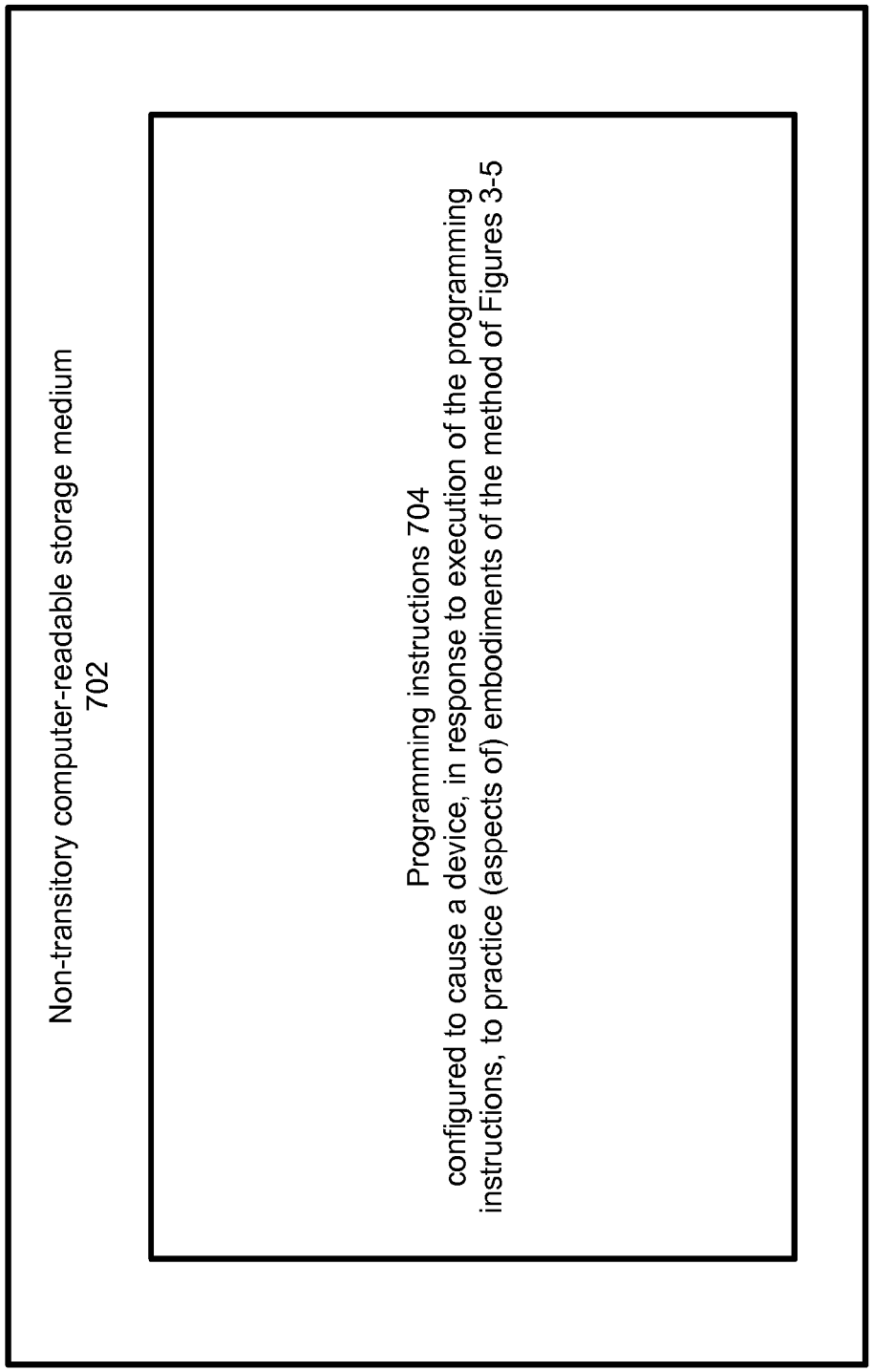
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content consumption device 108, in particular, AAM 200, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes of FIGS. 3-5, e.g., but not limited to, the various operations performed to perform automatic adjustment of audio. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 3-5. For one embodiment, at least one of processors 602 may be packaged together with computational logic 622 configured to practice aspects of processes of FIGS. 3-5 to form a System in Package (SiP). For one embodiment, at least one of processors 602 may be integrated on the same die with computational logic 622 configured to practice aspects of processes of FIGS. 3-5. For one embodiment, at least one of processors 602 may be packaged together with computational logic 622 configured to practice aspects of processes of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 includes a method for adjusting audio for a content consumption device. The method comprises identifying one or more persons consuming content from the content consumption device and adjusting audio of content being presented through the content consumption device based at least in part on identification of the one or more persons.

Example 2 includes the method of Example 1, wherein identifying one or more persons comprises uniquely identifying one or more persons.

Example 3 includes the method of Example 2, wherein adjusting audio of content comprises retrieving one or more preferences for the one or more persons, based at least in part on a result of the identifying and adjusting audio of content based at least in part on the one or more preferences.

Example 4 includes the method of Example 3, wherein adjusting audio of content based at least in part on the one or more preferences comprises determining one or more individual audio adjustments based on the one or more preferences for the one or more persons and determining a combined audio adjustment based on the one or more individual audio adjustments.

Example 5 includes the method of any of Examples 1-4, wherein identifying one or more persons comprises capturing an image proximate to the content consumption device and visually identifying the one or more persons based at least in part on the image.

Example 6 includes the method of Example 5, wherein visually identifying one or more persons from the image comprises performing facial detection on the image to identify faces of the one or more persons in the image.

Example 7 includes the method of any of Examples 1-6, wherein identifying one or more persons comprises capturing audio proximate to the content consumption device and performing voice recognition of the captured audio to identify voices for the one or more persons.

Example 8 includes the method of Example 7, wherein identifying voices comprises identifying audio falling in a human vocal range.

Example 9 includes the method of Example 8, wherein adjusting audio comprises, in response to identifying voices, lowering a volume of the audio of the content being presented to reduce interference with identified voices.

Example 10 includes the method of Example 7, wherein identifying voices comprises determining that an identified voice is delivering a voice command.

Example 11 includes the method of any of Examples 1-10, wherein identifying one or more persons comprises detecting one or more distances of the one or more persons from the content presentation device.

Example 12 includes the method of any of Examples 1-11, wherein the method further comprises identifying background noise present during presentation of content and adjusting audio comprises adjusting the audio based at least in part on the background noise.

Example 13 includes the method of any of Examples 1-12, wherein adjusting audio comprises controlling volume of the audio of the content being presented.

Example 14 includes the method of any of Examples 1-13, wherein adjusting audio comprises modifying one or more of equalizer settings, balance settings, faders settings and/or other audio effects settings for the audio of the content.

Example 15 includes an apparatus for adjusting audio for a content consumption device. The apparatus comprises one or more computer processors. The apparatus also comprises one or more identification modules configured to operate on the one or more computer processors to identify one or more persons consuming content from the content consumption device. The apparatus also comprises an audio adjustment manager configured to operate on the one or more computer processors to adjust audio of content being presented through the content consumption device based at least in part on identification of the persons.

Example 16 includes the apparatus of Example 15, wherein identify one or more persons comprises uniquely identify one or more persons.

Example 17 includes the apparatus of Example 16, wherein adjust audio of media content comprises retrieve one or more preferences for the one or more persons, based at least in part on a result of the one or more identification modules and adjust audio of content based at least in part on the one or more preferences.

Example 18 includes the apparatus of Example 17, wherein adjust audio of content based at least in part on the one or more preferences comprises determine one or more individual audio adjustments based on the one or more preferences for the one or more identified persons and determine a combined audio adjustment based on the one or more individual audio adjustments.

Example 19 includes the apparatus of any of Examples 15-18, wherein identify one or more persons comprises capture an image proximate to the content consumption device and visually identify the one or more persons from the image.

Example 20 includes the apparatus of Example 19, wherein visually identify one or more persons from the image comprises perform facial detection on the image to identify faces of the one or more persons in the image.

Example 21 includes the apparatus of any of Examples 15-20, wherein identify one or more persons comprises capture audio proximate to the content consumption device and perform voice recognition of the captured audio to identify voices for the one or more persons.

Example 22 includes the apparatus of Example 21, wherein identify voices comprises identify audio falling in a human vocal range.

Example 23 includes the apparatus of Example 22, wherein adjust audio comprises, in response to identify voices, lower a volume of the audio of the content being presented.

Example 24 includes the apparatus of Example 21, wherein identify voices comprises determine that an identified voice is delivering a voice command.

Example 25 includes the apparatus of any of Examples 15-24, wherein identify one or more persons comprises detect one or more distances of the one or more persons from the content presentation device.

Example 26 includes the apparatus of any of Examples 15-25, wherein the apparatus further comprises a noise detection module configured to operate on the one or more computer processors to identify background noise present during presentation of content and adjust audio comprises adjust the audio based at least in part on the background noise.

Example 27 includes the apparatus of any of Examples 15-26, wherein adjust audio comprises control volume of the audio of the content being presented.

Example 28 includes the apparatus of any of Examples 15-27, wherein adjust audio comprises modify one or more of equalizer settings, balance settings, and/or faders settings for the audio of the content.

Example 29 includes one or more computer-readable media containing instructions written thereon configured, in response to execution on a computing device, to cause the computing device to adjust audio for a content consumption device. The instructions are configured to identify one or more persons consuming content from the content consumption device and adjust audio of content being presented through the content consumption device based at least in part on identification of the one or more persons.

Example 30 includes the one or more computer-readable media of Example 29, wherein identify one or more persons comprises uniquely identifying one or more persons.

Example 31 includes the one or more computer-readable media of Example 30, wherein adjust audio of content comprises retrieve one or more preferences for the one or more persons, based at least in part on a result of the identifying and adjusting audio of content based at least in part on the one or more preferences.

Example 32 includes the one or more computer-readable media of Example 31, wherein adjust audio of content based at least in part on the one or more preferences comprises determine one or more individual audio adjustments based on the one or more preferences for the one or more persons and determine a combined audio adjustment based on the one or more individual audio adjustments.

Example 33 includes the one or more computer-readable media of any of Examples 29-32, wherein identify one or more persons comprises capture an image proximate to the content consumption device and visually identify the one or more persons based at least in part on the image.

Example 34 includes the one or more computer-readable media of Example 33, wherein visually identify one or more persons from the image comprises performance of facial detection on the image to identify faces of the one or more persons in the image.

Example 35 includes the one or more computer-readable media of any of Examples 29-34, wherein identify one or more persons comprises capturing audio proximate to the content consumption device and performance of voice recognition of the captured audio to identify voices for the one or more persons.

Example 36 includes the one or more computer-readable media of Example 35, wherein identify voices comprises identify audio falling in a human vocal range.

Example 37 includes the one or more computer-readable media of Example 36, wherein adjust audio comprises, in response to identifying voices, lower a volume of the audio of the content being presented to reduce interference with identified voices.

Example 38 includes the one or more computer-readable media of Example 35, wherein identify voices comprises determine that an identified voice is delivering a voice command.

Example 39 includes the one or more computer-readable media of any of Examples 29-38, wherein identify one or more persons comprises detect one or more distances of the one or more persons from the content presentation device.

Example 40 includes the one or more computer-readable media of any of Examples 29-39, wherein the instructions are further configured to identify background noise present during presentation of content and adjust audio comprises adjust the audio based at least in part on the background noise.

Example 41 includes the one or more computer-readable media of any of Examples 29-40, wherein adjust audio comprises control volume of the audio of the content being presented.

Example 42 includes the one or more computer-readable media of any of Examples 29-41, wherein adjust audio comprises modify one or more of equalizer settings, balance settings, faders settings and/or other audio effects settings for the audio of the content.

Example 43 includes an apparatus for adjusting audio for a content consumption device. The apparatus comprises means for identifying one or more persons consuming content from the content consumption device and means for adjusting audio of content being presented through the content consumption device based at least in part on identification of the one or more persons.

Example 44 includes the apparatus of Example 43, wherein means for identifying one or more persons comprises uniquely identifying one or more persons.

Example 45 includes the apparatus of Example 44, wherein means for adjusting audio of content comprises means for retrieving one or more preferences for the one or more persons, based at least in part on a result of the identifying and means for adjusting audio of content based at least in part on the one or more preferences.

Example 46 includes the apparatus of Example 45, wherein means for adjusting audio of content based at least in part on the one or more preferences comprises means for determining one or more individual audio adjustments based on the one or more preferences for the one or more persons and means for determining a combined audio adjustment based on the one or more individual audio adjustments.

Example 47 includes the apparatus of any of Examples 43-46, wherein means for identifying one or more persons comprises means for capturing an image proximate to the content consumption device and means for visually identifying the one or more persons based at least in part on the image.

Example 48 includes the apparatus of Example 47, wherein means for visually identifying one or more persons from the image comprises means for performing facial detection on the image to identify faces of the one or more persons in the image.

Example 49 includes the apparatus of any of Examples 43-48, wherein means for identifying one or more persons comprises means for capturing audio proximate to the content consumption device and means for performing voice recognition of the captured audio to identify voices for the one or more persons.

Example 50 includes the apparatus of Example 49, wherein means for identifying voices comprises means for identifying audio falling in a human vocal range.

Example 51 includes the apparatus of Example 50, wherein means for adjusting audio comprises means for, in response to identifying voices, lowering a volume of the audio of the content being presented to reduce interference with identified voices.

Example 52 includes the apparatus of Example 49, wherein means for identifying voices comprises means for determining that an identified voice is delivering a voice command.

Example 53 includes the apparatus of any of Examples 43-52, wherein means for identifying one or more persons comprises means for detecting one or more distances of the one or more persons from the content presentation device.

Example 54 includes the apparatus of any of Examples 43-53, wherein the apparatus further comprises means for identifying background noise present during presentation of content and means for adjusting audio comprises means for adjusting the audio based at least in part on the background noise.

Example 55 includes the apparatus of any of Examples 43-54, wherein means for adjusting audio comprises means for controlling volume of the audio of the content being presented.

Example 56 includes the apparatus of any of Examples 43-55, wherein means for adjusting audio comprises means for modifying one or more of equalizer settings, balance settings, faders settings and/or other audio effects settings for the audio of the content.

Computer-readable media (including least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method for automatically adjusting audio content of media content received from a network device via a network, comprising:

identifying, by a presentation engine of a content consumption device, one or more persons consuming the media content presented via the content consumption device;

determining, by the presentation engine, a physical location of the one or more persons relative to a location of the content consumption device;

determining, by the presentation engine, when one of the one or more persons attempts to input a voice command to control actions of the content consumption device; and automatically adjusting, by the presentation engine, the audio content via the content consumption device, wherein automatically adjusting the audio content comprises:

lowering an output volume of the audio content to facilitate capture, by a microphone associated with the content consumption device, of the input and accurate recognition of the voice command by the presentation engine, and modifying, based on the physical location of the one or more persons relative to the location of the content consumption device, equalizer settings, balance settings, or fader settings for the audio content.

2. The method of claim 1, wherein identifying one or more persons comprises uniquely identifying one or more persons.

3. The method of claim 2, wherein automatically adjusting the audio content further comprises:

retrieving one or more preferences for the one or more identified persons, based at least in part on a result of the identifying; and automatically adjusting the audio content based at least in part on the retrieved one or more preferences.

4. The method of claim 3, wherein automatically adjusting the audio content based at least in part on the one or more preferences comprises:

determining multiple individual audio content adjustments based on the one or more preferences for the one or more identified persons; and determining a combined audio adjustment based on the multiple individual audio content adjustments, wherein the combined audio content adjustment is generated based on each of the multiple individual audio content adjustments.

5. The method of claim 1, wherein identifying one or more persons comprises:

capturing an image proximate to the content consumption device; and visually identifying the one or more persons based at least in part on the image.

6. The method of claim 5, wherein visually identifying one or more persons from the image comprises performing facial detection on the image to identify faces of the one or more persons in the image.

7. The method of claim 1, wherein identifying one or more persons comprises:

capturing audio proximate to the content consumption device; and performing voice recognition of the captured audio to identify voices for the one or more persons.

8. The method of claim 7, wherein identifying voices comprises identifying the captured audio falling in a human vocal range.

9. The method of claim 8, wherein automatically adjusting the audio content further comprises, in response to identifying voices, lowering the output volume of the audio content to reduce interference with the identified voices.

10. The method of claim 1, wherein identifying one or more persons comprises detecting one or more distances of the one or more persons from the content presentation device.

11. The method of claim 1, further comprising:

capturing audio proximate to the content consumption device;

identifying, based on the captured audio, background noise present during presentation of the media content, wherein the background noise comprises audio outside a human vocal range; and wherein automatically adjusting the audio content comprises increasing an output volume of the audio content to compensate for the background noise.

12. The method of claim 1, further comprising:

determining, based on the identifying, an increase in a number of persons consuming the media content presented via the content consumption device; and increasing the output volume of the audio content to compensate for the increased number of persons.

13. The method of claim 1, further comprising:

determining, based on the physical location, a spatial distribution of the one or more persons consuming the media content presented via the content consumption device; and adjusting a left/right balance based on the determined spatial distribution.

14. An apparatus for automatically adjusting audio content of a media content received from a network device via a network, the apparatus comprising:

one or more computer processors;

one or more microphones for capturing audio proximate to a content consumption device;

one or more identification modules configured to operate on the one or more computer processors to:

identify one or more persons consuming the media content via the content consumption device, and determine a physical location of the one or more persons relative to a location of the content consumption device; and an audio adjustment manager configured to operate on the one or more computer processors to determine when one of the one or more persons attempts to input a voice command to control actions of the content consumption device, wherein the audio adjustment manager is further configured to operate on the one or more computer processors to automatically adjust the audio content via the content consumption device, and wherein automatically adjusting the audio content comprises:

lowering an output volume of the audio content to facilitate capture, by the one or more microphones, of the input over the audio content and accurate recognition of the voice command by the one or more identification modules, and modifying, based on the physical location of the one or more persons relative to the location of the content consumption device, equalizer settings, balance settings, or fader settings for the audio content.

15. The apparatus of claim 14, wherein the audio adjustment manager configured to automatically adjust the audio content is further configured to:

retrieve one or more preferences for the one or more identified persons, based at least in part on a result of the one or more identification modules; and automatically adjust the audio content based at least in part on the one or more preferences.

16. The apparatus of claim 15, wherein the audio adjustment manager configured to adjust the audio content based at least in part on the one or more preferences is further configured to:

determine multiple individual audio content adjustments based on the one or more preferences for the one or more identified persons; and determine a combined audio content adjustment based on the multiple individual audio content adjustments, wherein the combined audio content adjustment is generated based on each of the multiple individual audio content adjustments.

17. The apparatus of claim 14, wherein the one or more identification modules configured to identify the one or more persons are further configured to:

capture an image proximate to the content consumption device;

perform facial detection on the image to identify faces of the one or more persons in the image; and visually identify the one or more persons from the image based on the facial detection.

18. The apparatus of claim 14, wherein the one or more identification modules configured to identify the one or more persons are further configured to:

capture audio proximate to the content consumption device; and perform voice recognition of the captured audio to identify voices falling in a human vocal range for the one or more persons; and wherein the audio adjustment manager configured to adjust the audio content is further configured to:

lower the output volume of the audio content in response to the identified voices.

19. At least one non-transitory computer-readable storage medium, comprising a plurality of instructions, which when executed by at least one processor of a content consumption device cause the at least one processor to:

identify one or more persons consuming media content received from a network device via a network;

determine a physical location of the one or more persons relative to a location of the content consumption device;

determine when one of the one or more persons speaks an input associated with a voice command to control actions of the content consumption device; and automatically adjust the audio content via the content consumption device based least in part on identification of the one or more persons, wherein the instructions that cause the at least one processor to automatically adjust the audio content further cause the at least one processor to:

lower an output volume of the audio content to facilitate capture, by a microphone associated with the content consumption device, of the input over the audio content and accurate recognition of the voice command, and modify, based on the physical location of the one or more persons relative to the location of the content consumption device, equalizer settings, balance settings, or fader settings for the audio content.

* * * * *